(12) United States Patent
Dankenbring et al.

(10) Patent No.: US 7,133,805 B1
(45) Date of Patent: Nov. 7, 2006

(54) LOAD TEST MONITORING SYSTEM

(75) Inventors: David W. Dankenbring, Overland Park, KS (US); Charles L. Micklavzina, Overland Park, KS (US); Gary D. Willis, Jr., St. Joseph, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 10/886,250

(22) Filed: Jul. 7, 2004

(51) Int. Cl.
*G06F 11/30* (2006.01)

(52) U.S. Cl. .................. 702/186; 702/182; 702/183; 702/184; 702/185; 702/187; 702/188

(58) Field of Classification Search ............. 702/186, 702/182–185, 187, 188; 714/47
See application file for complete search history.

(56) References Cited

U.S. PATENT DOCUMENTS

| | | | | |
|---|---|---|---|---|
| 5,621,663 A | * | 4/1997 | Skagerling | 702/186 |
| 5,920,722 A | | 7/1999 | Damron | 395/706 |
| 6,249,886 B1 | | 6/2001 | Kalkunte | 714/47 |
| 6,449,739 B1 | | 9/2002 | Landan | 714/47 |
| 6,573,915 B1 | * | 6/2003 | Sivan et al. | 715/781 |
| 6,601,020 B1 | * | 7/2003 | Myers | 702/186 |
| 6,738,933 B1 | * | 5/2004 | Fraenkel et al. | 714/47 |
| 6,792,393 B1 | * | 9/2004 | Farel et al. | 702/186 |
| 6,898,556 B1 | * | 5/2005 | Smocha et al. | 702/186 |
| 2003/0033406 A1 | * | 2/2003 | John et al. | 709/224 |

* cited by examiner

*Primary Examiner*—Marc S. Hoff
*Assistant Examiner*—Phuong Huynh

(57) ABSTRACT

A system for load test monitoring a computer system is provided. The system includes a transaction generator to provide transactions to servers to load test the servers. The system includes one or more agents provided on the servers, the agents operable to obtain server statistics from servers during load testing. The system also includes a display including a plurality of gauges. Each gauge depicts transactions statistics based on the transactions generated by the transaction generator for each server and further depicts server statistics for each server as obtained by the agents. Based on the displayed transaction and server statistics the transaction generator is adjustable to optimize the load test of the servers.

21 Claims, 6 Drawing Sheets

FIG. 5a

COMPOSITE REPORT    LOADTEST REPORT    RELEASE 27 TEST - COMPOSITE
Test Time: 12/13/2003 08:42-10:01    March 2004 Forcast

| Qnames | Total Response Time | | | Component RT | | | Trans Count | | | | Mix Percentage | |
|---|---|---|---|---|---|---|---|---|---|---|---|---|
| | LR | TLOG | SLA | EI | API | TLOG | LR Pass | LR Fail | Fcst | LR | Fcst |
| acctIDSrch | 0.280 | 0.255 | 0.580 | 0.255 | 0.000 | 49,535 | 49,554 | 4,377 | 44,361 | 11.34% | 12.81% |
| acctNameSrch | 1.074 | 0.943 | 3.620 | 0.943 | 0.000 | 354 | 354 | | 284 | 0.07% | 0.08% |
| ADDACCTNTS_RZ | 0.494 | 0.365 | 0.390 | 0.005 | 0.360 | 53,190 | 53,190 | 149 | 40,550 | 11.22% | 11.71% |
| ADDACCTTOHIER_RZ | 2.536 | 2.399 | 3.300 | -0.012 | 2.411 | 42 | 42 | 2 | 216 | 0.01% | 0.06% |
| ADDPHONE_RZ | 0.460 | 0.448 | 1.910 | 0.003 | 0.445 | 312 | 312 | 2 | 36 | 0.07% | 0.01% |
| ADDPYMTMETHOD_RZ | 0.792 | 0.773 | 0.980 | 0.007 | 0.766 | 106 | 106 | | 455 | 0.02% | 0.13% |
| AMDCALLBACK_RZ | 0.957 | 0.933 | 0.270 | 0.010 | 0.923 | 16,516 | 16,516 | 829 | 13,678 | 3.65% | 3.95% |
| APPLYFINADJ_RZ | 1.408 | 1.395 | 0.550 | 0.006 | 1.389 | 2,554 | 2,554 | 17 | 1,928 | 0.54% | 0.56% |
| ASGNACCTMANITNL_RZ | 0.626 | 0.612 | 0.220 | 0.006 | 0.606 | 904 | 904 | 7 | 630 | 0.19% | 0.18% |
| BILLDIRECT_RZ | 0.176 | 0.163 | 0.500 | 0.007 | 0.156 | 1,432 | 1,432 | | 1,133 | 0.30% | 0.33% |
| CANCELEQPINVORD | 1.554 | 1.549 | 0.400 | 0.003 | 1.546 | 60 | 60 | 35 | 424 | 0.02% | 0.12% |
| CHANGEADDR_RZ | 0.557 | 0.545 | 0.860 | 0.006 | 0.539 | 6,956 | 6,956 | 607 | 6,032 | 1.59% | 1.74% |
| CLACCTINFO_RZ | 0.215 | 0.202 | 0.170 | 0.010 | 0.191 | 8,086 | 8,086 | 64 | 5,158 | 1.71% | 1.49% |
| CLSUBSINFO_RZ | 0.113 | 0.099 | 0.190 | 0.013 | 0.086 | 11,437 | 11,437 | | 7,365 | 2.41% | 2.13% |
| CONTRACT_RZ | 0.590 | 0.534 | 0.130 | 0.008 | 0.526 | 8 | 8 | 1,058 | 660 | 0.22% | 0.19% |
| CRDTCRDPAY_RZ | 2.375 | 2.340 | 0.302 | 0.005 | 2.335 | 842 | 842 | 138 | 614 | 0.21% | 0.18% |
| CRTBILLACCT | 2.730 | 2.712 | 0.450 | 0.008 | 2.704 | 308 | 308 | | 238 | 0.06% | 0.07% |
| CRTRESRVSBSCRP | | 0.000 | 0.400 | 0.000 | 0.000 | 0 | | 49 | 205 | 0.01% | 0.06% |
| CRTSUBSCBR | | 0.000 | 3.150 | 0.000 | 0.000 | 0 | | 21 | 122 | 0.00% | 0.04% |
| DELPYMTMETHOD_RZ | 0.926 | 0.911 | 0.510 | 0.007 | 0.904 | 32 | 32 | | 162 | 0.01% | 0.05% |

| PASS/FAIL | ANALYSIS | | | HISTORICAL DATA | | | | | |
|---|---|---|---|---|---|---|---|---|---|
| | Rcmd Sev | OWNER | −100% · · SLA · · · +100% | SLA(s) | LAST Test (t) | PCT OF SLA | AVG LAST 5 Runs(a) | Min | Max |
| PASS | | | | 0.580 | 0.280 | 48% | 0.553 | 0.206 | 2.340 |
| PASS | | | | 3.620 | 1.074 | 30% | 1.170 | 0.265 | 3.082 |
| PASS | | | | 0.390 | 0.494 | 127% | 0.244 | 0.065 | 6.643 |
| PASS | | | | 3.300 | 2.536 | 77% | 1.596 | 0.516 | 5.047 |
| PASS | | | | 1.910 | 0.460 | 24% | 0.340 | 0.119 | 5.346 |
| PASS | | | | 0.980 | 0.792 | 81% | 0.474 | 0.179 | 2.355 |
| FAIL | Sev2 | BE | | 0.270 | 0.957 | 355% | 0.864 | 0.130 | 4.885 |
| FAIL | Sev2 | BE | | 0.550 | 1.408 | 256% | 0.963 | 0.295 | 5.199 |
| FAIL | Sev2 | BE | | 0.220 | 0.626 | 284% | 0.492 | 0.083 | 4.372 |
| PASS | | | | 0.500 | 0.176 | 35% | 0.344 | 0.141 | 4.458 |
| FAIL | Sev2 | BE | | 0.400 | 1.554 | 389% | 1.072 | 0.513 | 2.626 |
| PASS | | | | 0.860 | 0.557 | 65% | 0.601 | 0.235 | 28.044 |
| FAIL | Sev2 | BE | | 0.170 | 0.215 | 126% | 0.509 | 0.217 | 13.591 |
| PASS | | | | 0.190 | 0.113 | 59% | 0.214 | 0.105 | 4.202 |
| FAIL | Sev2 | BE | | 0.130 | 0.590 | 454% | 0.574 | 0.033 | 1.061 |
| FAIL | Sev2 | BE | | 0.302 | 2.375 | 788% | 1.978 | 1.186 | 4.757 |
| FAIL | Sev2 | BE | | 0.450 | 2.730 | 607% | 2.118 | 1.385 | 30.341 |
| | | | | 0.400 | | 0% | 0.000 | 0.000 | 0.000 |
| | | | | 3.150 | | 0% | 0.000 | 0.000 | 0.000 |
| FAIL | Sev2 | BE | | 0.510 | 0.926 | 182% | 0.444 | 0.206 | 0.907 |

LOAD TEST MONITORING SYSTEM

CROSS-REFERENCE TO RELATED APPLICATIONS

This application contains subject matter related to U.S. patent application Ser. No. 10/787,709, filed Feb. 26, 2004, entitled "Enterprise Integration Test Tool," Theodore A. Burbidge III, et al inventors, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to computer software for testing, and more particularly, but not by way of limitation, to a system and method for monitoring a software load test system.

BACKGROUND OF THE INVENTION

Enterprises need to anticipate when the processing load on their computer systems, such as a customer service system, will exceed the system capacity in order to expand the system capacity in time to avoid service outages. In some cases, delays in handling, for example, customer calls due to inadequate computer system resources can be directly linked to quantifiable losses of revenue. Expanding computer system capacity before it is required, merely to ensure that the computer system capacity is not exceeded, results in sinking enterprise capital into computing resources well before these resources are actually needed.

Load testing a computer system is directed to commanding the computer system to process a desirable volume of transactions or other actions. Enterprises may conduct load testing of their computer systems to evaluate when increasing customer service loads will exceed system capacity and to evaluate system processing barriers. For example, it may be that the computer system has adequate processing power, but that a communication bottleneck between the processors and the secondary storage causes system transaction throughput to bog down.

The "busy hour" is a term of art which refers to a peak activity period for the computer system. In some circumstances, the "busy hour" may refer to a peak activity period for the computer system during a month or during a year. In some cases the annual busy hour may be the preferred test of the computer system, for example the mother's day busy hour for long distance telephone service. In other cases the monthly busy hour may be the preferred test of the computer system, for example a computer system which processes monthly reports or bills. Load testing activities may be directed to determining whether the computer system is able to process the busy hour transaction load without crashing or without exceeding response time requirements.

In the process of rolling out new or modified software or systems, it may be preferable to test the software and systems under real-world conditions before putting them into a production environment. By creating or simulating production loads, flaws or weaknesses in the code or systems may also be uncovered and repaired or improved prior to actual implementation.

SUMMARY OF THE INVENTION

According to one embodiment, a system to monitor a load test of a computer system is provided. The system includes a plurality of agents, each operable on at least one of a plurality of application servers to report server statistics of each of the application servers. The system also includes a monitor, a load generation tool, a screen analyzer, and a dashboard. The monitor is operable to receive at least some of the server statistics from the at least some of the plurality of agents. The load generation tool is operable to send a plurality of transactions to load test one or more of the plurality of application servers. The load generation tool generates a display for each of the plurality of application servers. The display contains at least one transaction statistic of one of the application servers. The screen analyzer is operable to capture as text a portion of at least one of the displays containing the transaction statistic for one of the application servers. The dashboard component receives the server statistics from the monitor and receives the at least one transaction statistics from the screen analyzer. The dashboard component also generates a dashboard display including the server statistics and the transaction statistics.

In another embodiment, a method for monitoring a load test of a computer system is provided. The method includes generating a plurality of transactions and sending the plurality of transactions to a plurality of application servers from a load test tool. The method provides for designating a first application server of the plurality of servers, and collecting at least one communication statistic from the first application server. The method includes collecting at least one performance statistic from the first application server, and displaying, using the load test tool, transaction statistics related to the transactions generated to test at least one of the plurality of application servers. The method also includes capturing a view of the display of the transaction statistics using a capture tool, and analyzing the view of the display with the capture tool to render the view of the display as a text to identify a text number related to the transaction statistics. The method includes displaying a gauge associated with the first application server illustrating the at least one communication statistic, the at least one performance statistic, and the at least one transaction statistic based on the captured text number. The method also includes providing the display the gauge to a web site accessible to monitor the load test.

In still another embodiment, the present disclosure provides a system for load testing and monitoring a computer system. The system includes a transaction generator to provide transactions to servers to load test the servers. The system includes one or more agents provided on the servers, the agents operable to obtain server statistics from servers during load testing. The system also includes a display including a plurality of gauges. Each gauge depicts transactions statistics based on the transactions generated by the transaction generator for each server and further depicts server statistics for each server as obtained by the agents. Based on the displayed transaction and server statistics the transaction generator is adjustable to optimize the load test of the servers.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 5a is a first portion of an exemplary spreadsheet of a second results report.

FIG. 5b is a second portion of the exemplary spreadsheet of the second results report.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Confirming that a desirable volume of transactions or other processing is being imposed on a computer system during load testing may be difficult. In some computer systems multiple computers cooperate to provide the needed processing capacity, and during load testing each computer system must be loaded with a desirable volume of processing. It may be that a load test operator is focused on three primary application servers involved in load testing and monitors the load imposed on these three primary application servers, but fails to notice that a seventh application server gets no volume at all. In this case, the entire load test may need to be rerun, wasting time and resources. Additionally, if several groups are interested in the progress of load testing, several monitoring processes attached to the application servers to observe the progress of load testing may alter and corrupt the results of the load test. What is needed is a tool to provide a unified display of pertinent load test statistics that can be accessed by many people without significantly burdening the computer system undergoing load test.

Figure 1:
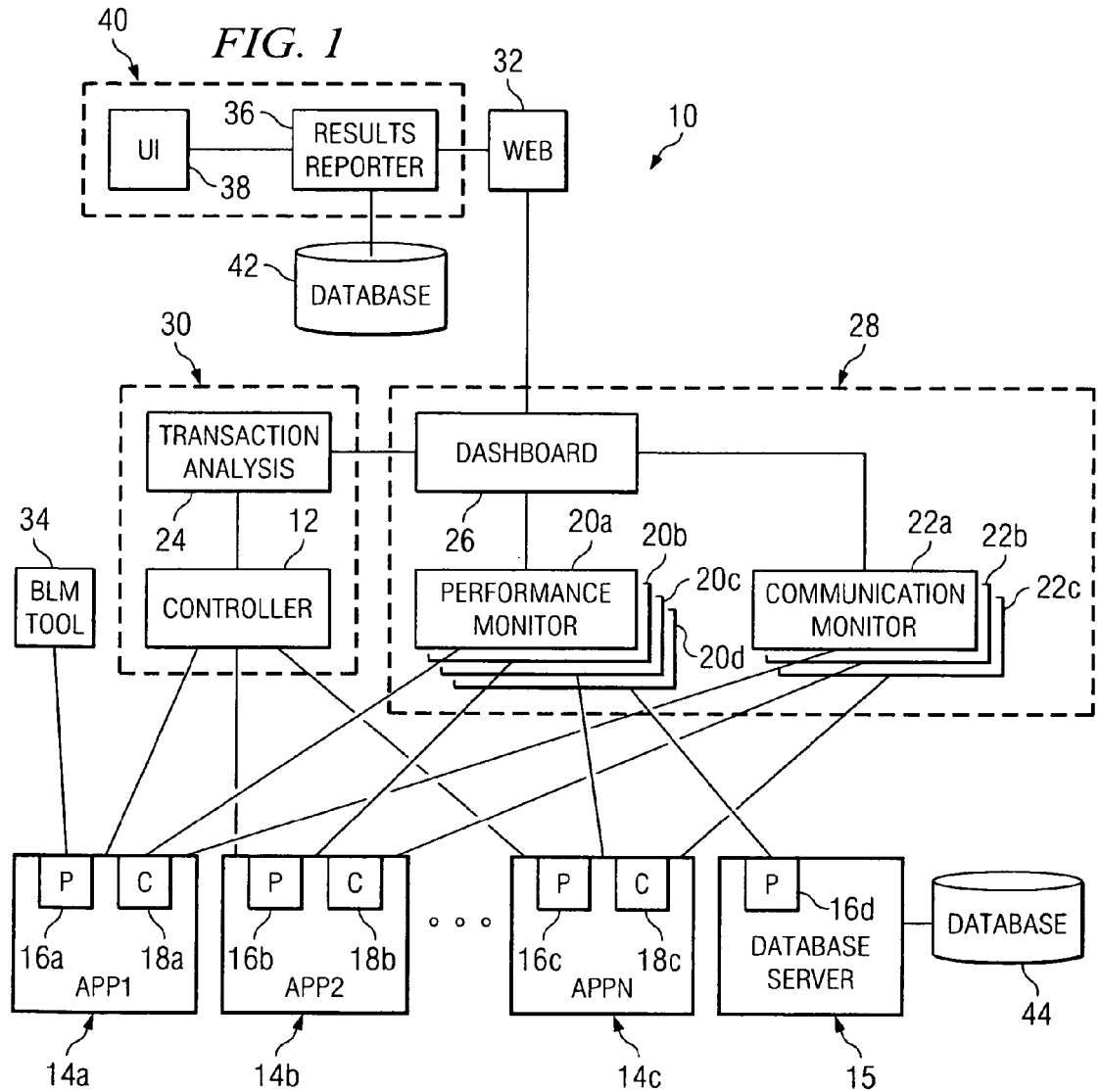
FIG. 1 is a block diagram of one embodiment of a load test monitoring system.

Turning now to FIG. 1, a block diagram of a load test monitoring system 10 is depicted. The load testing is controlled by a controller 12 which sends transaction or processing requests to a plurality of application servers 14—a first application server 14a, a second application server 14b, and a third application server 14c. While three application servers 14 are depicted in FIG. 1, in an embodiment either more or fewer application servers 14 may be used. The application servers 14 comprise the computer system undergoing load test. One or more applications of computer programs execute on each of the application servers 14, responding to requests to perform some action or to complete a transaction.

In the preferred embodiment, each transaction type is allocated a message queue on the application server 14. Transaction requests sent by the controller 12 to the application server 14 are placed on the appropriate message queue on the application server 14 according to the transaction type. Each transaction type is associated with one or more instances or a business logic module (BLM) that handles the transaction request, for example a computer program that takes the transaction request message from the message queue on the application server 14, processes the transaction request, and returns a transaction response to the controller 12 as a message placed on a reply message queue on the controller 12. The transaction response includes an indication of the cause of failure, when the transaction fails, including faulty data, timeout, connectivity issues, and other causes.

A BLM tool 34 may be employed to connect to an application server 14 and to initiate additional BLM instances if the message queue associated with the BLM is backing up undesirably, for example when several messages accumulate on the message queue before the BLM can act to remove the message from the message queue and to process the message. The BLM tool 34 provides access to several BLM control inputs including start BLMs, stop BLMs, turn off logs, turn on logs, and others. The BLM tool 34 supports selecting a log "tail" utility whereby the most recently generated logs associated with a selected message queue on the application server 14 are displayed on the screen as the logs are generated. The BLM tool 34 supports adding a time stamped text comment into the log database. The BLM tool 34 is a computer program which may execute on any general purpose computer system. General purpose computer systems are described in greater detail hereinafter. In the preferred embodiment, the BLM tool 34 executes on a desktop computer having a Microsoft Windows operating system. The BLM tool 34 may communicate with the application server 14 using a WinSock communication connection. WinSock is a Microsoft Windows operating system version of Unix sockets and provides a communication layer that depends upon transmission control protocol/internet protocol (TCP/IP) communications services. In the preferred embodiment, an instance of the BLM tool 34 communicates with one application server 14. To communicate concurrently with multiple application servers 14, multiple instances of the BLM tool 34 must be started. In other embodiments, a single instance of the BLM tool 34 may communicate with multiple application servers 14.

One or more database servers 15 may be accessed by the application servers 14. The controller 12, the application servers 14, and the database servers 15 are not primarily part of the load test monitoring system 10 but are primarily the subject of the load test monitoring system 10. The controller 12 and the application servers 14 are described further in U.S. patent application Ser. No. 10/787,709, filed Feb. 26, 2004, entitled "Enterprise Integration Test Tool," Theodore A. Burbidge III, et al inventors, which is incorporated herein by reference for all purposes. The database servers 15 and the application servers 14 are general purpose computer systems. The controller 12 is a software component which executes on a general purpose computer system.

The load test monitoring system 10 includes a plurality of performance agents 16, a plurality of communication agents 18, a plurality of performance monitors 20, a plurality of communication monitors 22, a transaction analysis component 24, and a dashboard component 26. The load test monitoring system 10 also includes a results reporter component 36 and a results reporter user interface (UI) 38 which execute on a general purpose computer system 40. The results reporter component 36 is in communication with a database 42.

The performance agents 16 and the communication agents 18 are software components executing on each of the application servers 14. The performance agents 16 include a first performance agent 16a, a second performance agent 16b, and a third performance agent 16c. A fourth performance agent 16d may execute on the database server 15, for example, which is in communication with a database 44. The performance agents 16 capture performance statistics, data, or information of the application server 14 on which they execute and provide the performance statistics to a plurality of performance monitor components 20 which execute on a load test monitor computer 28. A first performance monitor component 20a receives performance statistics from the first performance agent 16a, a second performance monitor component 20b receives performance statistics from the second performance agent 16b, a third performance monitor component 20c receives performance statistics from the third performance agent 16c, and a fourth performance monitor component 20d receives performance statistics from the fourth performance agent 16d. In the preferred embodiment, the performance agents 16 are Hewlett-Packard OpenView Glance software components operating in advisor mode. In the preferred embodiment, the performance agents 16 communicate with the performance monitors 20 over a WinSock connection. In other embodiments, other software components that capture system performance statistics may be employed as the performance agents 16.

Each of the performance monitor components 20 provides the performance statistics to the dashboard component 26. In the preferred embodiment, the performance statistics may include central processing unit (CPU) utilization, memory utilization, and disk utilization. In another embodiment other performance statistics may be collected and monitored. In the preferred embodiment, performance statistics are collected periodically every 15 seconds. In other embodiments, either a shorter or longer performance statistics collection period may be employed.

The communication agents 18 include a first communication agent 18a, a second communication agent 18b, and a third communication agent 18c. The communication agents 18 capture communication statistics, data, or information of the application server 14 on which they execute and provide the communication statistics to a plurality of communication monitor components 22 which execute on the load test monitor computer 28. A first communication monitor component 22a receives communication statistics from the first communication agent 18a, a second communication monitor component 22b receives communication statistics from the second communication agent 18b, and a third communication monitor component 22c receives communication statistics from the third communication agent 18c. In the preferred embodiment, the communication agents 18 communicate with the communication monitor components 22 over a WinSock connection.

Each of the communication monitor components 22 provides the communication statistics to the dashboard component 26. In the preferred embodiment, the communication agent 18 monitors the depth of a message queue, i.e., how many messages are accumulated on the message queue waiting for applications to remove the messages from the message queue. In another embodiment, other communication statistics may be collected and monitored. In the preferred embodiment, communication statistics are collected periodically every 15 seconds. In other embodiments, either a shorter or longer communication statistics collection period may be employed.

In some embodiments, the performance monitor 20 and the communication monitor 22 associated with an application server 14 may be unified in a single load test monitor component. For example, in an embodiment, the functions of the first performance monitor 20a and the first communication monitor 22a may be combined in a load test monitor. The performance monitor 20 and the communication monitor 22 are software components which execute on a general purpose computer system. In other embodiments, other agents collecting other statistics and providing the statistics to other monitors or to the load test monitor may be employed.

The transaction analysis component 24 executes on a load generation computer 30. The controller 12 also executes on the load generation computer 30. The transaction analysis component 24 interacts with the controller 12 to obtain transaction statistics for each of the application servers 14 and provides the transaction statistics to the dashboard component 26. In the preferred embodiment, the controller 12 is the Mercury LoadRunner tool, and the transaction analysis component 24 is composed of a SnagIt screen capture tool and a runSnagIt software shell built around SnagIt. The runsnagIt software invokes and controls the SnagIt screen capture tool and provides transaction statistics to the dashboard component 26 over a WinSock connection. It will be appreciated that this functionality may be accomplished with custom programming or applications other than LoadRunner and SnagIt may also be employed. The Mercury LoadRunner tool provides a display screen that includes several transaction statistics about the application servers 14. The Mercury LoadRunner tool regularly redraws the display screen with updated transaction statistics. The SnagIt screen capture tool is employed to capture the display screen as a snap shot. The SnagIt screen capture tool then analyzes the snap shot using optical character recognition (OCR) software to render the snap shot as a text, thereby capturing the transaction statistics in text. The runsnagIt software shell separates the transaction statistics from the other text rendered by the SnagIt screen capture tool and provides the transaction statistics to the dashboard component 26.

In the preferred embodiment, the transaction statistics include a transactions per hour statistic, a transactions per second statistic, a path failure statistic, and a response time statistic. The path failure statistic contains statistics on the number of failures due to each of the failure causes including faulty data, timeout, connectivity issues, and other causes. In another embodiment, other transaction statistics may be collected and monitored. In the preferred embodiment, transaction statistics are collected periodically every 15 seconds. In other embodiments, either a shorter or longer transaction statistics collection period may be employed.

The dashboard component 26 receives the collected transaction statistics, performance statistics, and communication statistics and employs the statistics to update a plurality of gauge models or instrument models, one gauge model per application server 14 and per database server 15. The dashboard component 26 is a software component which executes on a general purpose computer system. In the preferred embodiment, the dashboard component 26 updates the gauge models with the most recently collected statistics periodically on 15 second intervals. In another embodiment, the dashboard component 26 may update the gauge models at a shorter or a longer periodic interval. Each gauge model or instrument model comprises statistics, data, or information representing a view of a gauge or instrument showing selected statistics for one application server 14 or one database server 15. The dashboard component 26 composes the several gauge models into a load test monitoring display. In the preferred embodiment, the load test monitoring display is stored in joint photographic experts group (JPEG) format, but in other embodiments a different storage format may be employed, for example a bit map. The dashboard component 26 provides the load test monitoring display to a web server 32, and the web server 32 makes the load test monitoring display accessible to many viewers.

In an embodiment, a response-time estimator may provide an indication of the average response time of a selection of the highest volume transactions based on recent logs, for example the ten highest volume transactions. This information may be displayed in the load test monitoring display 100 or it may be available in a selectable display, not shown.

Figure 2:
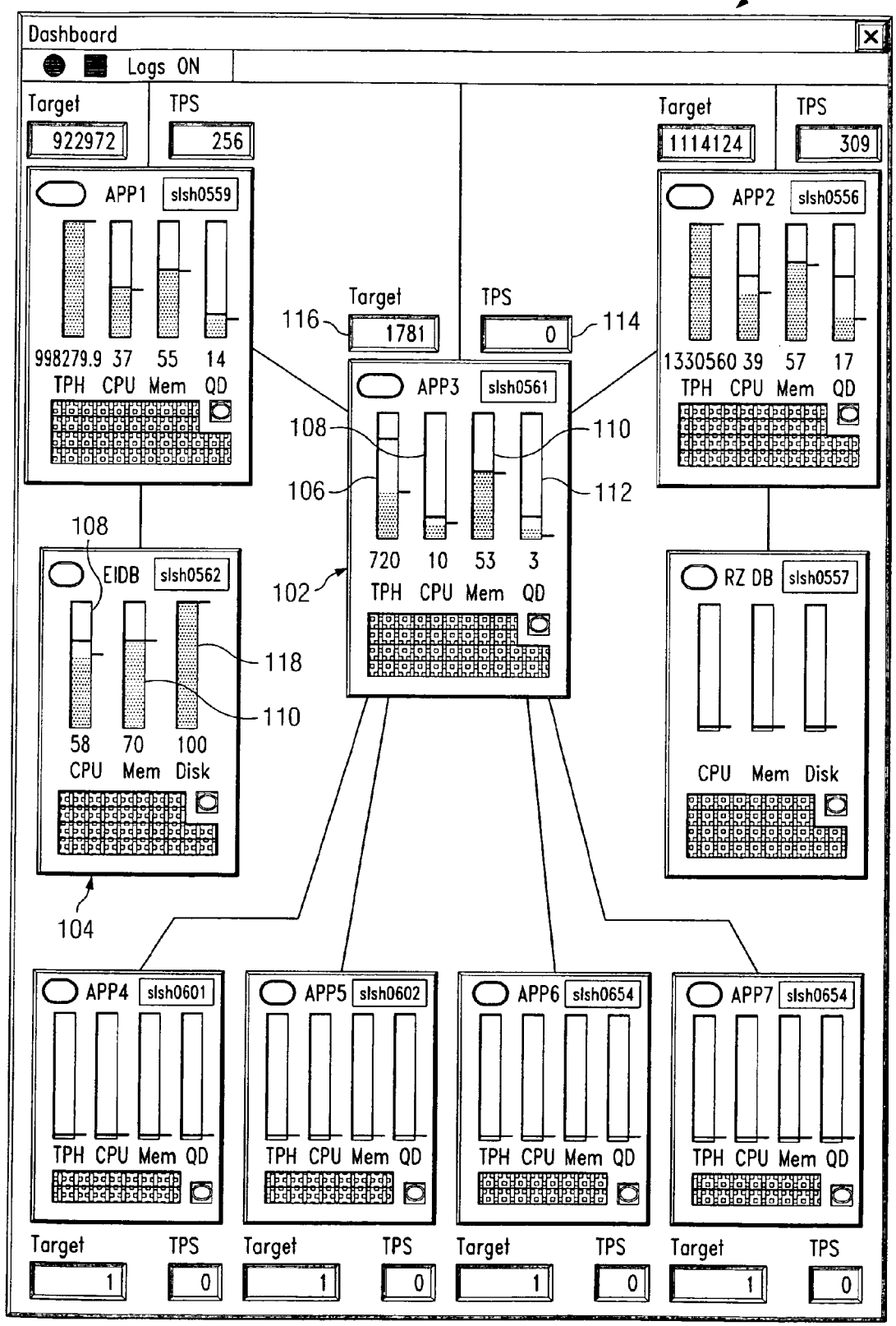
FIG. 2 is an exemplary load test monitoring display screen according to one embodiment.

Turning to FIG. 2, an exemplary display of a load test monitoring display 100 is depicted. The load test monitoring display 100 displays views of nine gauges—seven views of gauges associated with application servers 14 and two views of gauges associated with database servers 15. In some embodiments, the load test monitoring display 100 may be different, for example including different views of gauges.

An application server gauge view 102 comprises four tape type instrument displays that provide a transactions per hour indication 106, a CPU utilization indication 108, a memory utilization indication 110, and a queue depth indication 112 associated with the application server 14. If the queue depth indication 112 indicates that an excessive queue depth is being reached, the load test operator may wish to take action to decrease the queue depth, for example employing the BLM tool 34 to initiate additional message queue managers. The application server gauge view 102 also includes a transactions per second statistic read-out 114 and a transactions per hour target read-out 116. A transactions per hour target is associated with every application server 14 undergoing load test. It is the objective of load testing to impose at least the volume of transactions identified in the transactions per hour target on the application servers 14. If the transactions per hour indication 106 does not reach the transactions per hour target read-out, the load test operator may wish to take action to increase the volume of transactions being sent to the subject application server 14. A database server gauge view 104 comprises three tape type instrument displays that provide the CPU utilization indication 108, the memory utilization indication 110, and a disk utilization indication 118.

The load test monitoring display 100 provides a high-level view of the entire load testing operation, enabling the load test operator to determine the status of load testing with a brief scan. Note that the load test monitoring display 100 composes and synchronizes information from several different sources and different tools. In the preferred embodiment, the information displayed in the load test monitoring display 100 represents statistics which are concurrent to within fifteen seconds of each other. The vertical tape of each of the tape type instrument displays may be color coded to further assist rapid analysis of the statistics collected from load testing.

In an embodiment, the dashboard component 26 saves each of the load test monitoring displays 100 produced on a periodic basis. The series of load test monitoring displays 100, which includes all or any portion of the information gathered and saved during load testing, may be replayed to review various aspects of the test and results. The recorded testing information may be reviewed during or after testing and may be replayed at slower, faster or at real-time speeds. In some instances, for example, it may be useful for testers or others to review or play-back only certain portions or segments of the saved load test monitoring displays 100, such as where critical test events or failures occurred. The series of load test monitoring displays 100 may also be viewed in rapid play-back, for example where the series of all stored load test monitoring displays 100 associated with a load test are played-back in five minutes. Any of the play-back modes may be used to support diagnosis of, for example, a failed load test. In one embodiment, load test information saved from different load tests may be displayed and review, for example, together to compare load tests and results.

Figure 3:
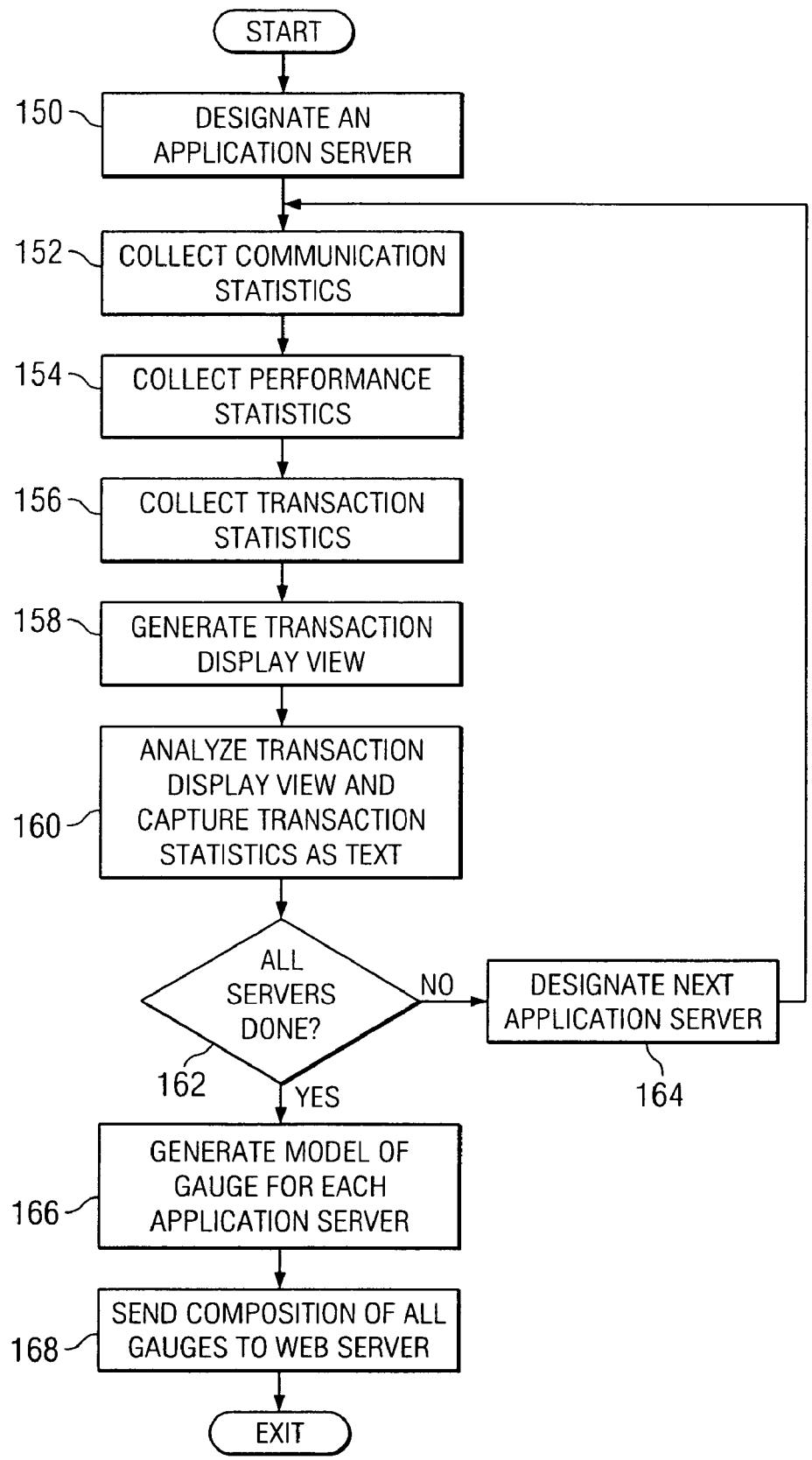
FIG. 3 is a flow chart according to one embodiment of a method of monitoring load testing.

Turning now to FIG. 3, a flow chart depicts a method of monitoring load testing. In block 150 an application server 14 is selected to be monitored. The method proceeds to block 152 where communication statistics of the selected application server 14 are collected. The method proceeds to block 154 where performance statistics of the selected application server 14 are collected. The method proceeds to block 156 where transaction statistics of the selected application server 14 are collected. The method proceeds to block 158 where a transaction display view including the transaction statistics is generated, for example by the Mercury LoadRunner tool. The method proceeds to block 160 where the transaction display view is analyzed and the transaction statistics are captured as text. The transaction display view may be captured in a screen shot, the screen shot may be analyzed with optical character recognition software to generate a text, and the text pertaining to the transaction statistics may be selected. This information may be obtained using other techniques, such as communicating directly with LoadRunner to obtain the statistical information directly.

The method proceeds to block 162 where if statistics from all application servers 14 and all database servers 15 have not been collected, the method proceeds to block 164. In block 164 a different application server 14 or database server 15 is selected. The method returns to block 152. By looping through blocks 152, 154, 156, 158, 160, 162, and 164 statistics are collected from all application servers 14 and database servers 15 at roughly the same time, within the time period of the collection interval, for example within fifteen seconds. The statistics are therefore synchronized, for example to within fifteen seconds, of one another.

When statistics from all application servers 14 and all database servers 15 have been collected, the method proceeds to block 166 where a gauge model for each application server 14 and each database server 15 is generated or updated, capturing the statistics, data, or information associated with the application servers 14 and database servers 15. The method proceeds to block 168 where the several gauge models are composed into the load test monitoring display 100, and the load test monitoring display 100 is sent to the web server 32.

The method described above may be repeated periodically to update the load test monitoring display 100. In the preferred embodiment, the method described above is repeated every fifteen seconds.

With reference to FIG. 1, the results reporter component 36 is operable to generate two load test reports based on logs created by the application servers 14 and logs created by the controller 12. The results reporter component 36 is a software component which may executed on a general purpose computer system. A plurality of load controller logs are generated by the controller 12, and a plurality of transaction logs are generated by the application servers 14. Both the load controller logs and the transaction logs are stored in the database 42. The results reporter UI 38 is used to request the two load test reports to be generated based on a start date and time and a time interval. For example, a start date and time of May 20, 2004:15:42:00 and a time interval of 30 hours would select all logs in the database 42 with time stamps from May 20, 2004:15:42:00 to May 21, 2004:21:41:59. Test results may be summarized over long intervals, analyzing the logs generated by multiple independent load test runs.

A first results report is generated as a multi-sheet spreadsheet including a sheet for each application server 14 and database server 15, where each sheet depicts a time based plot of CPU utilization, memory utilization, transactions per hour, and communications statistics for the subject server during the time interval specified. The first results report also includes a sheet depicting a time based plot of CPU utilization for each of the application servers 14 and database servers 15, a sheet depicting a time based plot of memory utilization for each of the application servers 14 and database servers 15, a sheet depicting a time based plot of transactions per hour for each of the application servers 14, and a time based plot of communications statistics for each of the application servers 14. The first results report also includes a sheet including all comments provided using the BLM tool 34. In another embodiment, a spreadsheet may not be employed, and the graphical information may be stored in a different format, such as a portable document format (PDF).

Figure 4:
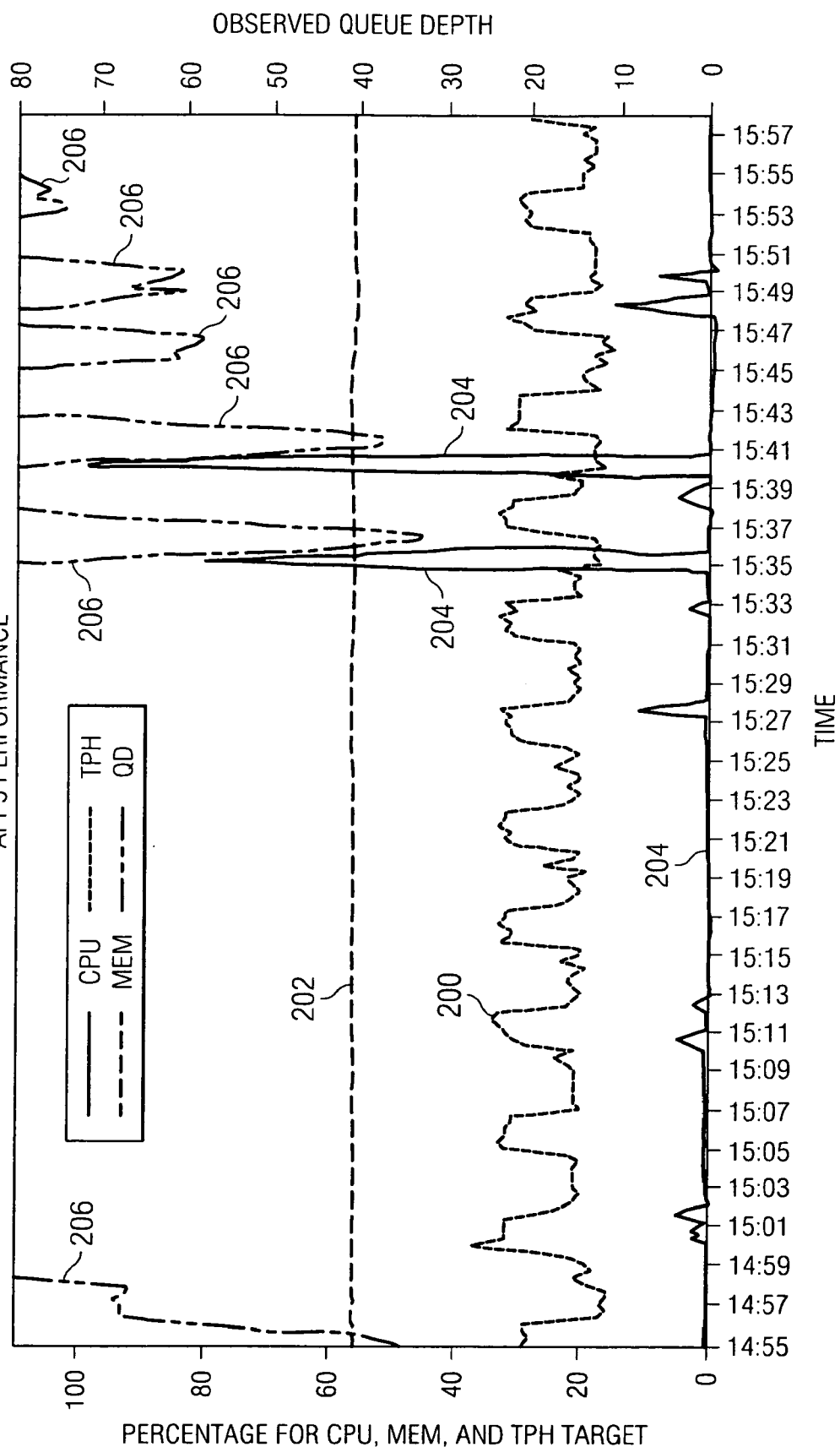
FIG. 4 is an exemplary time based plot of load testing statistics portion of a first results report.

Turning now to FIG. 4, an exemplary time based plot of CPU utilization, memory utilization, transactions per hour, and communication statistics is provided. A CPU utilization time based plot 200 represents the percent of CPU utilization of the application server 14 at different times. The percentage scale is represented along the left border of the graph. A memory utilization time based plot 202 represents the percent of memory utilization of the application server 14 at different times. A queue depth time based plot 204 represents the number of messages pending on the message queues of the application server 14 at different times. The queue depth scale is represented along the right border of the graph. A transactions per hour time based plot 206 represents the transactions per hour as a percentage of the desirable transaction volume of the application server 14 at different times. These time based plots are exemplary. In other embodiments, other performance, communication, and load volume statistics may be monitored, and the display may be different. One skilled in the art can readily imagine the appearance of the other time based plots of the first results report described above. The comments sheet is simply a spread sheet with a column for date, a column for time, and a column containing the arbitrary text comment.

Turning now to FIGS. 5a and 5b, an exemplary second results report is depicted. The spreadsheet is too wide to depict on one drawing, hence the drawing is split across two drawings FIGS. 5a and 5b. The second results report is generated as a multi-sheet spreadsheet including a sheet summarizing the load test results for each individual application server 14, a sheet summarizing the load test results for each individual database server 15, and a sheet summarizing the load test results composed from all application servers 14 and database servers 15. Every row in the results report sheets represents test results associated with a single transaction type. Recall that every message queue on the application servers 14 is associated with one transaction type and with one or more BLM instances responsible for processing the transactions requested by the messages placed on the message queue.

As shown in FIG. 5a, each load test results sheet includes columns for a controller observed transaction response time 250, an application server observed transaction response time 252, a service level agreement on transaction response time 254, a response time due to business logic processing 256, a response time due to interface access 258, a total application server observed transactions 260, a total controller observed transaction passes 262, a total controller observed transaction failures 264, a forecast transactions per hour 266, an actual percentage of transaction type of total transaction volume 268, and a forecast percentage of transaction type of total transaction volume 270.

As shown in FIG. 5b, each load test results sheet further includes columns for a pass/fail of the transaction type 272, a failure severity 274, an owner of a failure 276, a response time of last transaction 278, a response time of last transaction as percentage of service level agreement response time 280, an average of response time of last five transactions 282, a minimum response time 284, and a maximum response time 286. In FIG. 5b the service level agreement on transaction response time is repeated in a SLA column 288.

A graphical depiction 290 of a portion of the summary information is provided indicating the range of response time as a percentage of the service level agreement response time, where the last response time is located in this response time range coded with the letter 't' 292 and where the average response time over the last five transactions is located in this response time range coded with the letter 'a' 294. The second results report depicted in FIG. 5a and FIG. 5b is a composite report combining summary information from all the application servers 14 and all the database servers 15. The spreadsheet depicted in FIG. 5a and FIG. 5b and described above is only exemplary. In other embodiments, other summary information and other presentation of the information may be employed, including some format other than a spread sheet. Those skilled in the art will readily understand how the exemplary summary information depicted in FIG. 5a and FIG. 5b may be retrieved from logs generated by the application servers 14, the database servers 15, and the controller 12.

Figure 6:
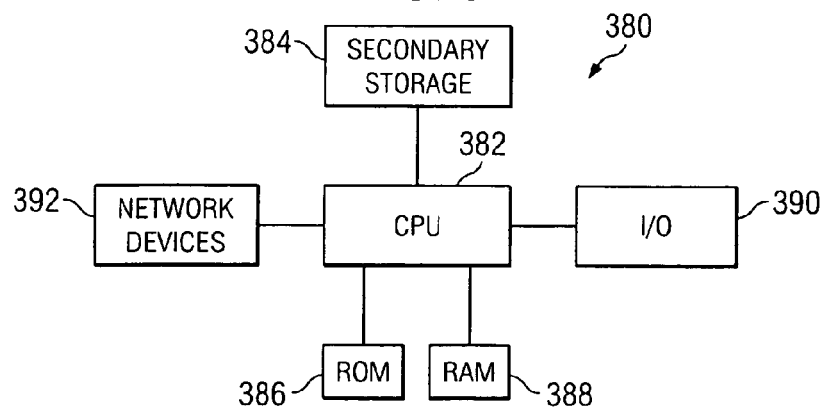
FIG. 6 illustrates an exemplary general purpose computer system suitable for implementing the several embodiments of the disclosure.

The load test monitoring system 10 described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A system to monitor a load test of a computer system, comprising:
    a plurality of agents, each operable on at least one of a plurality of application servers to report server statistics of each of the application servers;
    a monitor operable to receive at least some of the server statistics from the at least some of the plurality of agents;
    a load generation tool operable to send a plurality of transactions to load test one or more of the plurality of application servers, the load generation tool operable to generate a display for each of the plurality of application servers, the display containing at least one transaction statistic of one of the application servers;
    a screen analyzer operable to capture as an image a portion of at least one of the displays containing the transaction statistic for one of the application servers and to convert the image into a text number; and
    a dashboard component operable to receive the server statistics from the monitor and to receive the at least one transaction statistics from the screen analyzer as a text number, the dashboard component further operable to generate a dashboard display including the server statistics and the transaction statistics;
    wherein the plurality of agents are further defined as plurality of performance agents and a plurality of communications agents, each operable on at least one of the plurality of application servers the performance agents operable to report a performance statistic of each of the application servers, the communication agents operable to report a communication statistic of each of the application servers;
    wherein the monitor is further defined as a plurality of monitors each operable to receive performance statistics from at least one of the performance agents and further receive communication statistics from at least one of the communication agents, the monitor operable to receive performance statistics and communication statistics from the performance and communication agents; and
    wherein the received communication statistics comprise the message queue depth of each of the application servers.

2. The system of claim 1 wherein the performance agent periodically reports the at least one performance statistic of the application server, the communication agent periodically reports the at least one communication statistic of the application server, the screen analyzer periodically reports the at least one transaction statistic, and the dashboard component periodically generates the dashboard display of the performance statistics, the communication statistics, and the transaction statistics.

3. The system of claim 2 wherein the dashboard component generates the dashboard display in joint photographic experts group format and transmits the dashboard display to a web server.

4. The system of claim 3 wherein the dashboard display is saved along with a time stamp each time the dashboard display is generated, and wherein a sequence of dashboard displays comprising each of the saved dashboard displays is available for rapid playback.

5. The system of claim 1 wherein the load generation tool is the Mercury LoadRunner tool and the screen analyzer is the SnagIt screen capture tool.

6. The system of claim 1 wherein the performance statistics is selected from a group consisting of a central processor unit utilization statistic, a memory utilization statistic, and a disk utilization statistic.

7. The system of claim 1 wherein the transaction statistics are selected from the group consisting of a transactions per hour, a transactions per second, a path failure, and a response time.

8. The system of claim 1 further including a results reporter operable to analyze logs generated by the application server and logs generated by the load generation tool to produce one or more reports on the load test.

9. The system of claim 8 wherein one of the reports includes a graphical display representing the range of transaction response times as a percentage of a transaction response time service level agreement.

10. The system of claim 9 wherein the graphical display further provides an indication of a response time of the last test transaction and an indication of a average response time of the final five test transactions.

11. A method for monitoring a load test of a computer system, comprising:
generating a plurality of transactions and sending the plurality of transactions to a plurality of application servers from a load test tool;
designating a first application server of the plurality of servers;
collecting at least one communication statistic from the first application server as a text number;
collecting at least one performance statistic from the first application server as a text number;
displaying, using the load test tool, transaction statistics related to the transactions generated to test at least one of the plurality of application servers;
capturing a view of the display of the transaction statistics using a capture tool;
analyzing the view of the display with the capture tool to render the view of the display as a text to identify a text number related to the transaction statistics;
providing the text numbers from the communication statistic, the performance statistic, and the transaction statistics to a dashboard component, the dashboard component operable to generate a gauge using the text numbers;
displaying the gauge associated with the first application server illustrating the at least one communication statistic, the at least one performance statistic, and the at least one transaction statistic based on the captured text numbers; and
providing the display the gauge to a web site accessible to monitor the load test.

12. The method of claim 11 wherein the collecting the at least one communication statistic, the collecting the at least one performance statistic, the collecting the at least one transaction statistic, the providing the text numbers to a dashboard component, the generating the model of the gauge, and the providing the display based on the model of the gauge to a web site is repeated on a periodic basis.

13. The method of claim 12 further comprising:
storing the display of the gauge along with a timestamp associated the display; and
displaying a sequence of the stored displays of the gauge in rapid playback.

14. The method of claim 11 further including:
observing the display of the gauge; and
adjusting the load generation tool to optimize load testing of the computer system.

15. The method of claim 14 wherein adjusting the load generation tool includes causing the load generation tool to generate more transactions per unit time.

16. The method of claim 11 wherein the at least one communication statistic is a queue depth statistic.

17. The method of claim 11 wherein the at least one performance statistic selected from a group consisting of a central processing unit utilization statistic, a memory utilization statistic, and a disk utilization statistic.

18. The method of claim 11 wherein the at least one transaction statistic selected from a group consisting of a transactions per hour statistic, a transactions per second statistic, a path failure statistic, and a response time statistic.

19. The method of claim 11 further including generating, after the completion of load testing the computer system, one or more reports based on logs generated by the first application server and based on logs generated by the load test tool.

20. A system for load testing and monitoring a computer system, comprising:
a transaction generator to provide transactions to servers to load test the servers;
one or more agents provided on the servers, the agents operable to obtain server statistics from servers during load testing;
a dashboard component operable to receive transactions statistics as text numbers based on the transactions generated by the transaction generator for each server and server statistics as text numbers from the one or more agents; and
a display generated by the dashboard component including a plurality of gauges, each gauge depicting transactions statistics based on the transactions generated by the transaction generator for each server and further depicting server statistics for each server as obtained by the agents, and wherein based on the displayed transaction and server statistics the transaction generator is adjustable to optimize the load test of the servers.

21. The system of claim 20 wherein the server statistics are further defined as server performance and communication statistics.

* * * * *